(12) United States Patent
Vazquez

(10) Patent No.: US 11,268,488 B2
(45) Date of Patent: Mar. 8, 2022

(54) FREEWAY TRAFFIC BARS FOR ENERGY

(71) Applicant: Jose Vazquez, Sonoma, CA (US)

(72) Inventor: Jose Vazquez, Sonoma, CA (US)

( * ) Notice: Subject to any disclaimer, the term of this patent is extended or adjusted under 35 U.S.C. 154(b) by 0 days.

(21) Appl. No.: 17/318,464

(22) Filed: May 12, 2021

(65) Prior Publication Data

US 2021/0262431 A1  Aug. 26, 2021

(51) Int. Cl.
*F03B 17/06* (2006.01)
*F03B 11/00* (2006.01)

(52) U.S. Cl.
CPC .......... *F03B 17/062* (2013.01); *F03B 11/004* (2013.01)

(58) Field of Classification Search
CPC .... F03B 17/062; F03B 11/004; F03B 17/005; F03B 17/04; F03B 13/06
See application file for complete search history.

(56) References Cited

U.S. PATENT DOCUMENTS

2012/0025532 A1* 2/2012 Song .................. F03B 13/1815
290/53

* cited by examiner

*Primary Examiner* — Viet P Nguyen
(74) *Attorney, Agent, or Firm* — Steven A. Nielsen; www.NielsenPatents.com

(57) ABSTRACT

Mechanical movement exerted upon or over roadways is transmitted and converted to mechanical movement conducive towards the production of electrical energy. In one disclosed system, ramped or angled push bars are disposed within a roadway, such that a front set of bars and back set of bars will not be moved simultaneously. A series of one way values may enable subterranean fluid chambers to move a pendulum flywheel or rotor in a continuous direction or in a back and forth movement.

1 Claim, 5 Drawing Sheets

FREEWAY TRAFFIC BARS FOR ENERGY

CROSS-REFERENCE TO RELATED APPLICATIONS

Not Applicable

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION

Field of the Invention

The invention generally relates to energy production systems. More particularly, the invention relates to means and methods of displacing road embedded components to produce energy.

Prior Art

US published patent application US20040012202A1 by Dobbs, published on Jan. 22, 2004 discloses a roller system placed upon a road, with the rollers generating electricity by use of captured energy transmitted by passing vehicles. A shortfall of Dobbs is that large voids in roadways would be need to implement the system, creating a risk of injury to pedestrians and animals.

U.S. Pat. No. 4,238,687 issued on Dec. 9, 1980 to Martinez uses a plurality of rocker plates mounted in a roadway with a complicated gear linkages system that eventually transmits mechanical movement to a electric generator. A shortfall in Martinez is the extra mechanical mechanisms to be fabricated, installed and maintained in order to convert vertical linear movement to rotational movement.

BRIEF SUMMARY OF THE INVENTION

The present invention overcomes shortfalls in the related art by presenting an unobvious and unique combination and configuration of methods and components to produce power and or electricity by harnessing the energy exerted by vehicles driving over streets.

The invention overcomes shortfalls in the related art by using a specialized hydraulic system that alternates the direction of fluids in response to traffic bars being moved by vehicles. Artfully placed one way valves and other components achieve favorable results over the prior art.

A disclosed embodiment overcomes shortfalls in the art by positioning sets of road actuators that are spaced so as to not be activated at the same time.

The disclosed embodiments overcome shortfalls in the known related art by eschewing the complicated mechanical systems of Martinez and the open pit system of Dobbs.

These and other objects and advantages will be made apparent when considering the following detailed specification when taken in conjunction with the drawings.

REFERENCE NUMERALS IN THE DRAWINGS

Figure 1:
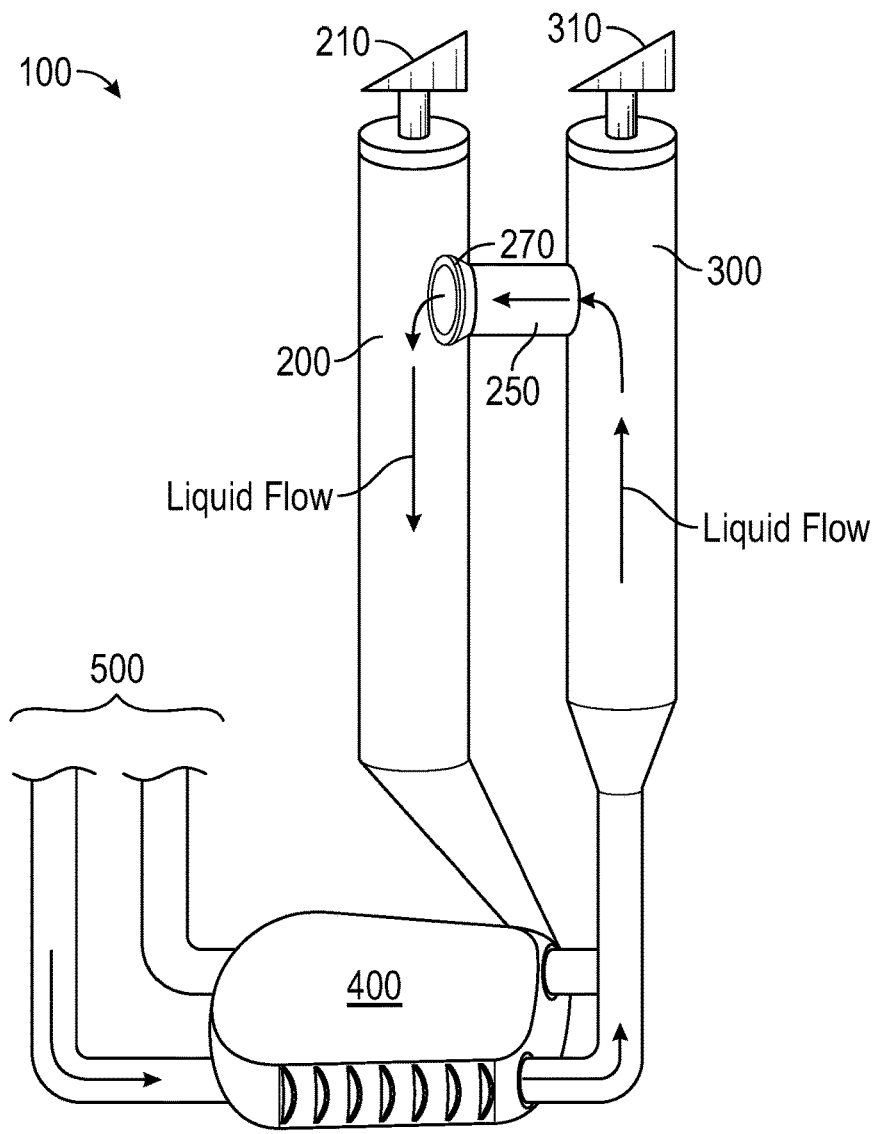
FIG. 1 depicts a perspective view of disclosed components

100 a disclosed embodiment in general
200 first fluid pathway
205 first leg of the first fluid pathway
207 horizontal section of the first fluid pathway
208 first downward fluid path
210 road to vehicle energy bar of the first fluid pathway
213 first vertical fluid path disposed below a one way valve
250 upper transitional fluid bridge between first 200 and second 300 fluid pathway
270 one way valve
300 second fluid pathway
305 first leg of the second fluid pathway
307 horizontal section of the second fluid pathway
308 second downward fluid path
310 road to vehicle energy bar of the second fluid pathway
313 second vertical fluid path disposed below a one way valve
400 turbine for production of electricity
500 pendulum piece or rotor or dynamo
520 cupped air fins on pendulum piece 530
530 air powered pendulum piece
550 air pipes
700 vehicle
800 by pass fluid channel

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

FIG. 1 depicts a disclosed embodiment that may comprise a first fluid pathway 200 in fluid connection with a first energy bar 210 with the first fluid pathway in fluid connection with a turbine 400 or other system of electrical generation, the turbine in fluid connection with a second fluid pathway 300, the second fluid pathway in fluid connection with a second energy bar 310, with a upper transitional fluid bridge 250 in fluid connection between the first and second fluid pathways, with a one way valve 270 allowing fluid to pass from the second pathway to the first pathway. A disclosed embodiment may include one or more first and second fluid pathway systems 500 that are also in fluid connection with the turbine.

The disclosed components overcome shortfalls in the art as the upper transitional fluid bridge 250 between the first and second fluid pathways keeps the fluid flowing in a full circular path even when the two sets of energy bars 210, 310 are pressed in sequences that are counter productive to the intended path of fluid flow.

Figure 2:
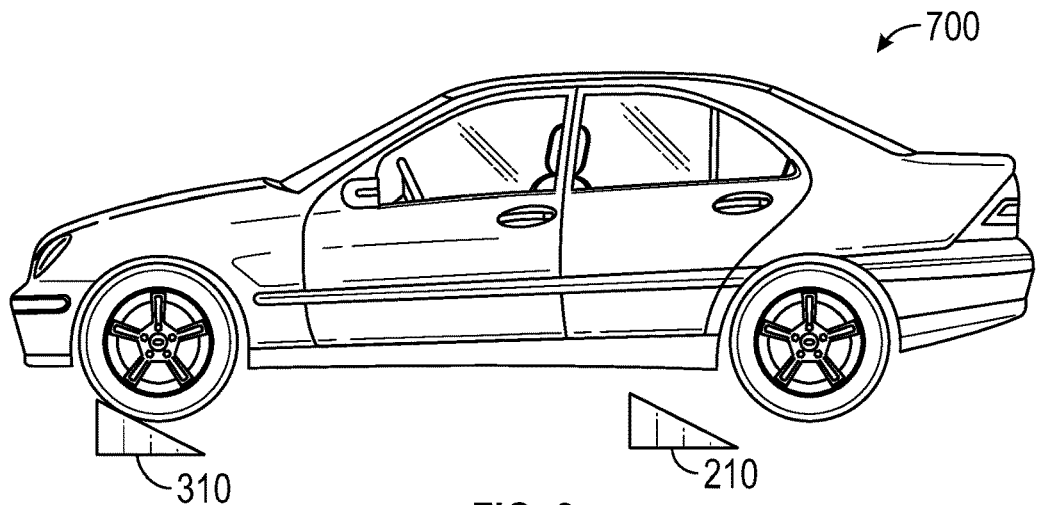
FIG. 2 depicts a vehicle passing over disclosed components

FIG. 2 depicts a vehicle 700 passing over a disclosed two piston system. The first and second pistons are disposed at an interval to minimize the chances of both positions being pressed down at the same time.

Figure 3:
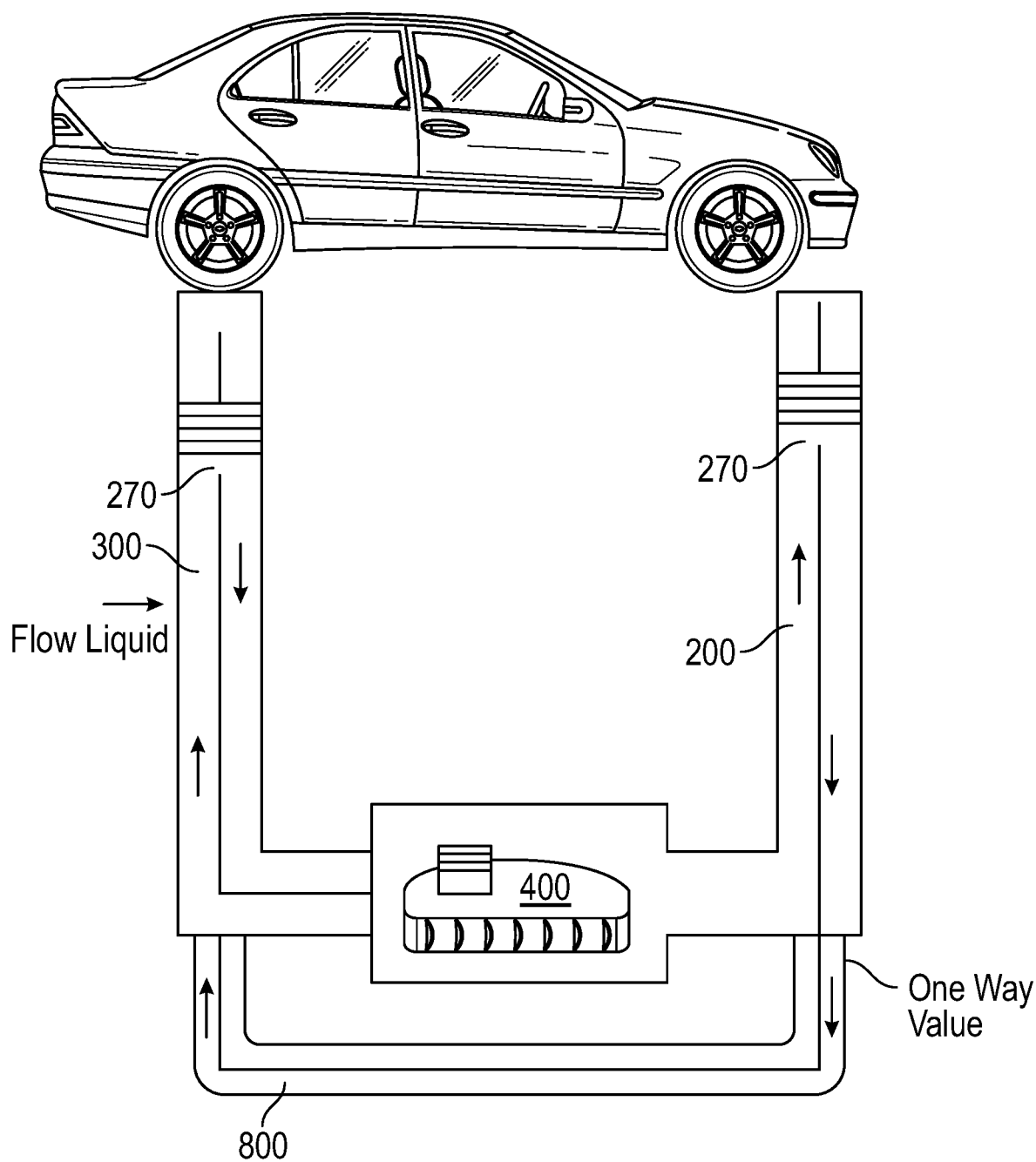
FIG. 3 depicts a disclosed embodiment

FIG. 3 depicts a flow path of fluid that is moved by a vehicle and a two pump system. An optional by pass fluid channel 800 may be incorporated so as to enable a circular rotation of the turbine 400 or pulsating or bi directional movement of the turbine.

Figure 4:
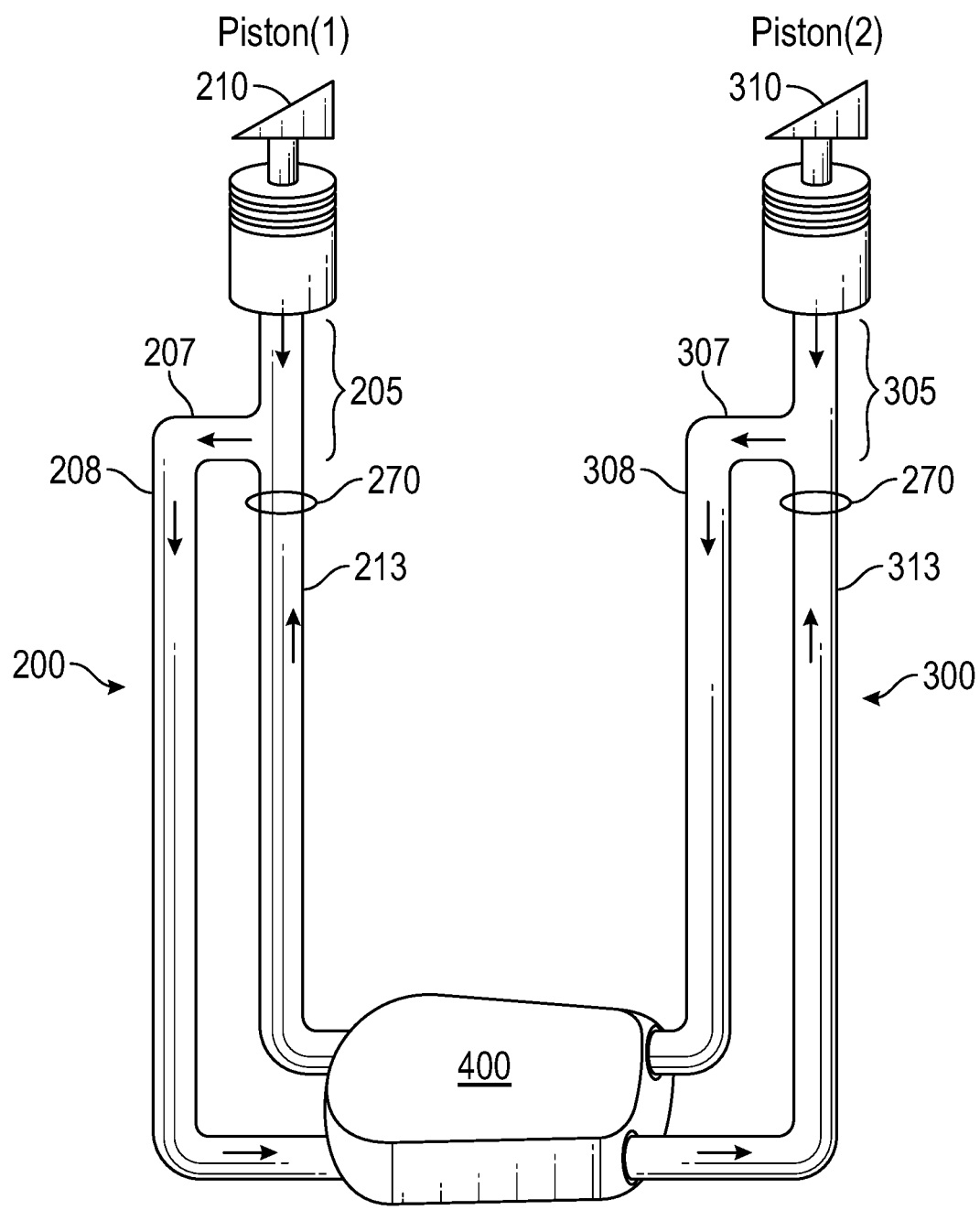
FIG. 4 depicts a disclosed embodiment

FIG. 4 further depicts a more refined view of the disclosed two piston system. The artful use of one way valves 270 keeps a circular movement of fluid flowing through the turbine even when the first piston 210 and second piston 310 are simultaneously activated. Disclosed embodiments overcome shortfalls in the related art by use of a first leg 205 in the first fluid pathway 200 and a first leg 305 in the second fluid pathway 300, as these first legs accommodate the effective use of a one way valve 270 disposed upon a vertical section 213, 313 and at, near or adjacent to a horizontal section 207, 307 such that simultaneous inputs from the first 210 and second 310 pistons will not disturb the circular fluid flow reaching the turbine or other electrical generation system.

Figure 5:
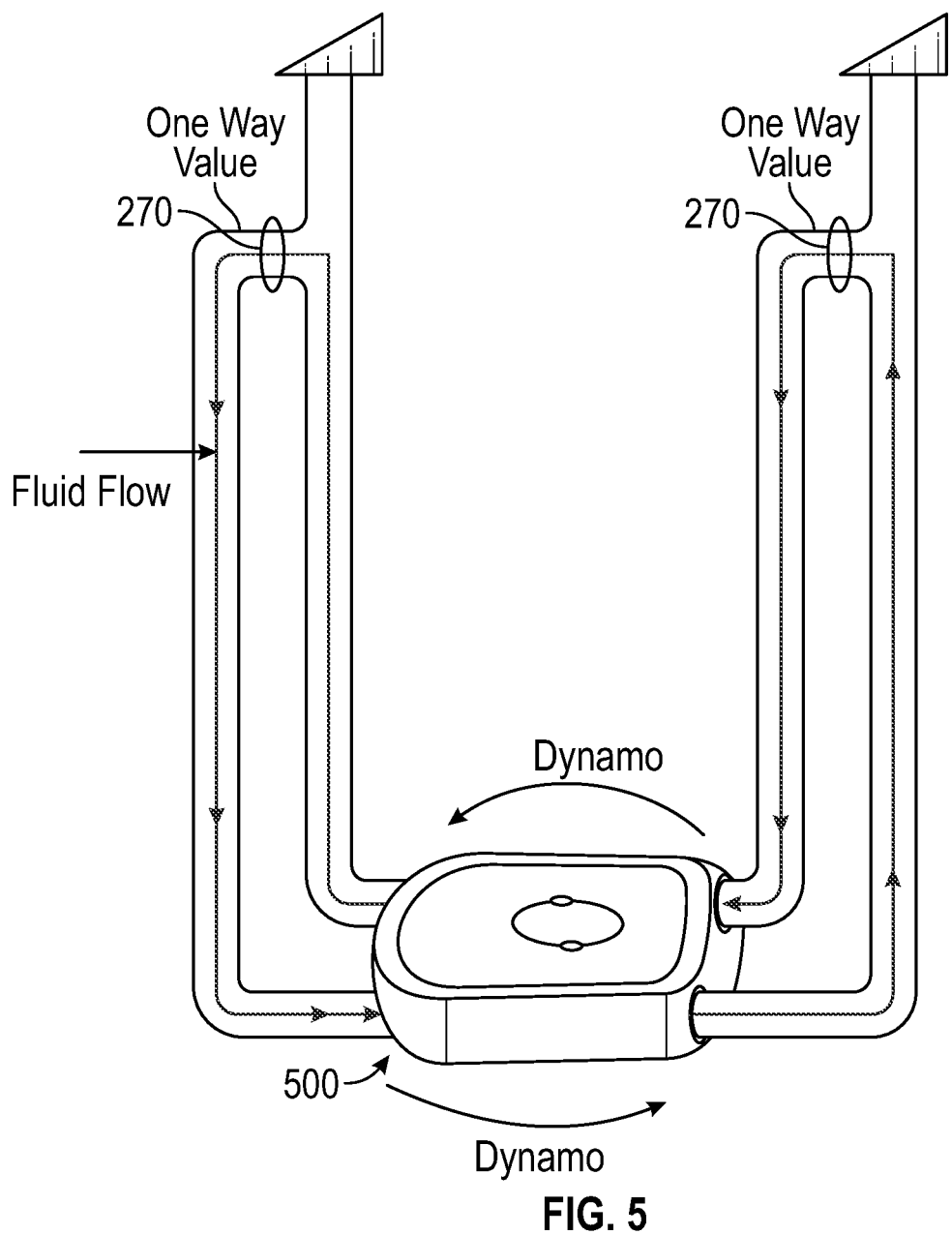
FIG. 5 depicts circular fluid movement in a disclosed embodiment

FIG. 5 shows a circular fluid system powered by the disclosed two piston system. A fluid system may move or otherwise power a dynamo 500.

Figure 6:
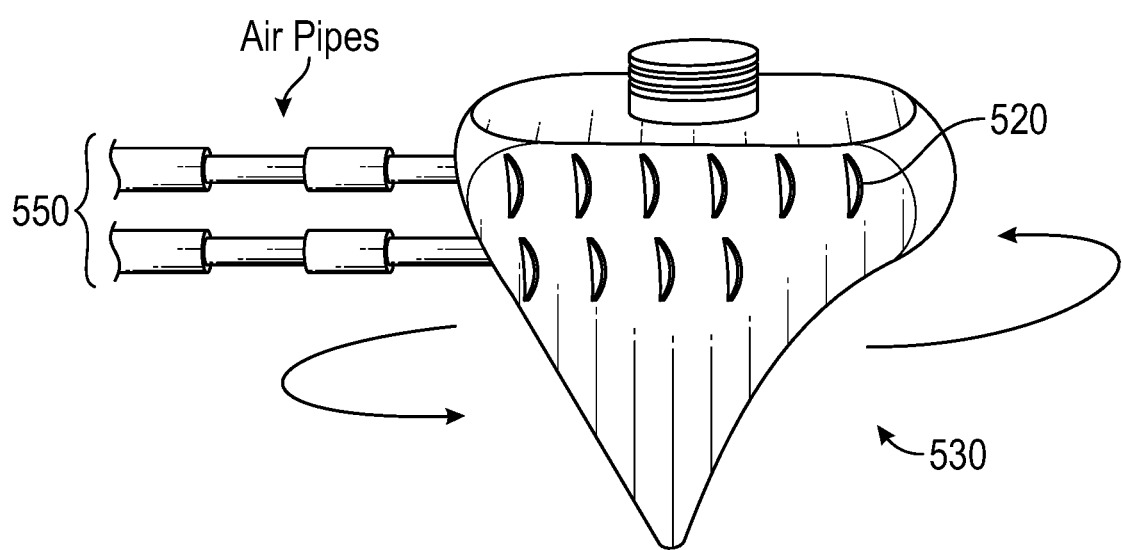
FIG. 6 depicts a pendulum piece for connection electrical generator

FIG. 6 depicts a disclosed air or fluid powered pendulum 530. Air, water or fluid pipes 550 may move the pendulum in a circular direction to generate electricity. The movement of the pendulum may be enhanced by the use of cupped air fins 520 that catch the movement of fluid or air from the air pipes.

The figures are not to scale. The disclosed air or fluid lines and turbines may be disposed at the sides of roads, so as to not require deep excavation below streets.

What is claimed is:

1. A system of mechanical movement transmission, the system comprising:
   a) a first piston (210) attached to a first angled roadway ramp; the first piston in fluid connection with a first fluid channel (200), the first fluid channel in fluid connection with;
   b) a first leg (205), the first leg comprising a vertical fluid connection with the first piston; a horizontal fluid connection (207), the horizontal fluid connection in fluid connection with a first vertical fluid path (213) with a first one way valve (270) disposed in the first vertical fluid path; the horizontal fluid connection in fluid connection with;
   c) a first downward fluid path (208), the first downward fluid path in fluid connection with a turbine (400); the turbine in fluid connection with a second vertical fluid path (313) with a second one way valve disposed within the second vertical fluid path;
   d) a second piston (310) attached to a second angled roadway ramp, the second piston in vertical fluid connection with a second leg (305) of a second fluid pathway;
   e) the second leg (305) in fluid connection with the second vertical fluid path (313); the second leg in fluid connection with a horizontal section (307), with the horizontal section in fluid connection with a second downward fluid path (308); the second downward fluid path in fluid connection with;
   f) the turbine and the turbine in fluid connection with the first vertical fluid path.

* * * * *